United States Patent
Xia et al.

(10) Patent No.: US 10,131,561 B2
(45) Date of Patent: *Nov. 20, 2018

(54) TREATMENT OF PRODUCED WATER CONCENTRATE

(71) Applicant: BL TECHNOLOGIES, INC., Minnetonka, MN (US)

(72) Inventors: Jiyang Xia, Shanghai (CN); Hai Yang, Shanghai (CN); Wenqing Peng, Shanghai (CN); Yiwen Sun, Shanghai (CN); Chunjie Liu, Shanghai (CN)

(73) Assignee: BL Technologies, Inc., Minnetonka, MN (US)

( * ) Notice: Subject to any disclaimer, the term of this patent is extended or adjusted under 35 U.S.C. 154(b) by 587 days.

This patent is subject to a terminal disclaimer.

(21) Appl. No.: 14/657,492

(22) PCT Filed: Aug. 15, 2013

(86) PCT No.: PCT/US2013/055026
§ 371 (c)(1),
(2) Date: Mar. 13, 2015

(87) PCT Pub. No.: WO2014/042809
PCT Pub. Date: Mar. 20, 2014

(65) Prior Publication Data
US 2015/0259232 A1  Sep. 17, 2015

(30) Foreign Application Priority Data
Sep. 13, 2012 (CA) .................... 2789820

(51) Int. Cl.
*C02F 1/04* (2006.01)
*C02F 1/40* (2006.01)
(Continued)

(52) U.S. Cl.
CPC ............ *C02F 9/00* (2013.01); *E21B 43/2408* (2013.01); *E21B 43/34* (2013.01); *C02F 1/048* (2013.01);
(Continued)

(58) Field of Classification Search
CPC ...... E21B 43/40; E21B 43/24; E21B 43/2408; E21B 43/34; C02F 9/00; C02F 1/048;
(Continued)

(56) References Cited

U.S. PATENT DOCUMENTS 4,305,829 A   12/1981   Kelsey et al.
5,574,027 A   11/1996   Bernstein
(Continued)

FOREIGN PATENT DOCUMENTS

CA     2509309 A1   12/2005
CN     1358671 A    7/2002
(Continued)

OTHER PUBLICATIONS

Unofficial English Translation of Chinese Office Action issued in connection with corresponding CN Application No. 201380047910.9 dated Jul. 7, 2016.
(Continued)

*Primary Examiner* — Jennifer H Gay

(57) ABSTRACT

Water, for example produced water from a steam assisted gravity drainage (SAGD) or cyclic steam stimulation (CSS) heavy oil recovery operation, is treated, for example to recover water re-use in creating steam. The produced water is concentrated, for example in one or more thermal treatment devices such as an evaporator and a crystallizer. A solvent and a compound or solution comprising multivalent cations is added to the concentrate. Solids precipitate and are separated from the concentrate. The solvent may be recovered for re-use in treating more concentrate.

26 Claims, 1 Drawing Sheet

(51) Int. Cl.
*C02F 1/52* (2006.01)
*C02F 1/72* (2006.01)
*C02F 9/00* (2006.01)
*E21B 43/24* (2006.01)
*E21B 43/34* (2006.01)
*C02F 101/32* (2006.01)
*C02F 103/10* (2006.01)

(52) U.S. Cl.
CPC .............. C02F 1/40 (2013.01); C02F 1/5236 (2013.01); C02F 1/5272 (2013.01); C02F 1/72 (2013.01); C02F 2001/5218 (2013.01); C02F 2101/32 (2013.01); C02F 2103/10 (2013.01); C02F 2301/046 (2013.01)

(58) Field of Classification Search
CPC ...... C02F 1/26; C02F 1/52; C02F 1/72; C02F 2001/5218
See application file for complete search history.

(56) References Cited

U.S. PATENT DOCUMENTS

| | | | |
|---|---|---|---|
| 6,675,747 B1 * | 1/2004 | Goidich | F22B 29/062 122/1 B |
| 6,786,696 B2 | 9/2004 | Herman et al. | |
| 7,428,926 B2 | 9/2008 | Heins | |
| 7,438,129 B2 | 10/2008 | Heins | |
| 7,591,309 B2 * | 9/2009 | Minnich | C02F 1/04 159/47.1 |
| 7,681,643 B2 * | 3/2010 | Heins | E21B 43/24 159/24.1 |
| 7,686,079 B2 * | 3/2010 | Gamache | C02F 1/5245 166/266 |
| 7,789,159 B1 * | 9/2010 | Bader | B01D 61/04 166/279 |
| 8,506,467 B2 * | 8/2013 | Minnich | E21B 43/2406 588/252 |
| 2005/0022989 A1 * | 2/2005 | Heins | E21B 43/2406 166/272.3 |
| 2005/0279500 A1 * | 12/2005 | Heins | C02F 1/04 166/266 |
| 2006/0032630 A1 * | 2/2006 | Heins | C02F 1/04 166/266 |
| 2007/0051513 A1 * | 3/2007 | Heins | E21B 43/24 166/265 |
| 2008/0110630 A1 * | 5/2008 | Minnich | C02F 1/04 166/303 |
| 2009/0050467 A1 | 2/2009 | Fickenscher et al. | |
| 2009/0101583 A1 | 4/2009 | Perry | |
| 2010/0038081 A1 * | 2/2010 | Gamache | C02F 1/5245 166/267 |
| 2011/0139451 A1 | 6/2011 | McKeen et al. | |
| 2011/0147316 A1 | 6/2011 | Polizzotti et al. | |
| 2012/0087737 A1 | 4/2012 | Minnich et al. | |
| 2012/0097609 A1 | 4/2012 | Xia et al. | |
| 2012/0325743 A1 * | 12/2012 | Xia | B01D 61/10 210/638 |
| 2013/0319663 A1 | 12/2013 | Buchanan et al. | |
| 2014/0083706 A1 * | 3/2014 | Scott | F22B 37/26 166/305.1 |
| 2015/0252658 A1 * | 9/2015 | Xia | C02F 9/00 166/303 |
| 2015/0259232 A1 * | 9/2015 | Xia | C02F 9/00 166/267 |
| 2015/0292314 A1 * | 10/2015 | Xia | C02F 9/00 166/266 |

FOREIGN PATENT DOCUMENTS

| | | |
|---|---|---|
| CN | 1902437 A | 1/2007 |
| CN | 102190380 A | 9/2011 |
| CN | 102452700 A | 5/2012 |
| CN | 102452700 B | 7/2014 |
| GB | 2357528 A | 6/2001 |
| GB | 2362333 A | 11/2001 |
| RU | 2 215 871 C2 | 11/2003 |
| WO | 2005054746 A2 | 6/2005 |
| WO | 2011115636 A1 | 9/2011 |

OTHER PUBLICATIONS

PCT Search Report and Written Opinion issued in connection with corresponding PCT Application No. PCT/US2013/055026 dated Jan. 30, 2014.
Betzer-Zilevitch, M.M., "Steamdrive Direct Contact Steam Generation for SAGD," Canadian Society of Unconvential Gas, Society of Petroleum Engineers, Canadian Unconventional Resources Conference, CSUG/SPE 148689, pp. 1-19 (Nov. 15-17, 2011).
First Office Action and Search issued in connection with corresponding RU Application No. 2015107882 dated May 11, 2017.
Chinese Patent Application No. 201380047845, Office Action dated Aug. 3, 2016.
Chinese Patent Application No. 201380047910.9, Office Action dated Nov. 11, 2017—English Translation not Available.
Chinese Patent Application No. CN201380047845, Office Action dated Dec. 19, 2017—English Translation Not Available.
International Patent Application No. PCT/US2013/056175, International Search Report and Written Opinion dated Jan. 30, 2014.
Oman Patent Application No. OM/P/2015/000059, Office Action dated Sep. 12, 2017—English Translation available.
Russian Patent Application No. 2015107264, Office Action dated Jun. 23, 2017.
Russian Patent Application No. 2015107264, Office Action dated Nov. 1, 2017—English Translation Available.
U.S. Appl. No. 14/428,213, Non-Final Office Action dated Sep. 22, 2017.
U.S. Appl. No. 14/428,213, Final Office Action dated Mar. 28, 2018.
Russian Patent Application No. 2015107882 Office Action dated Jul. 5, 2018.

* cited by examiner

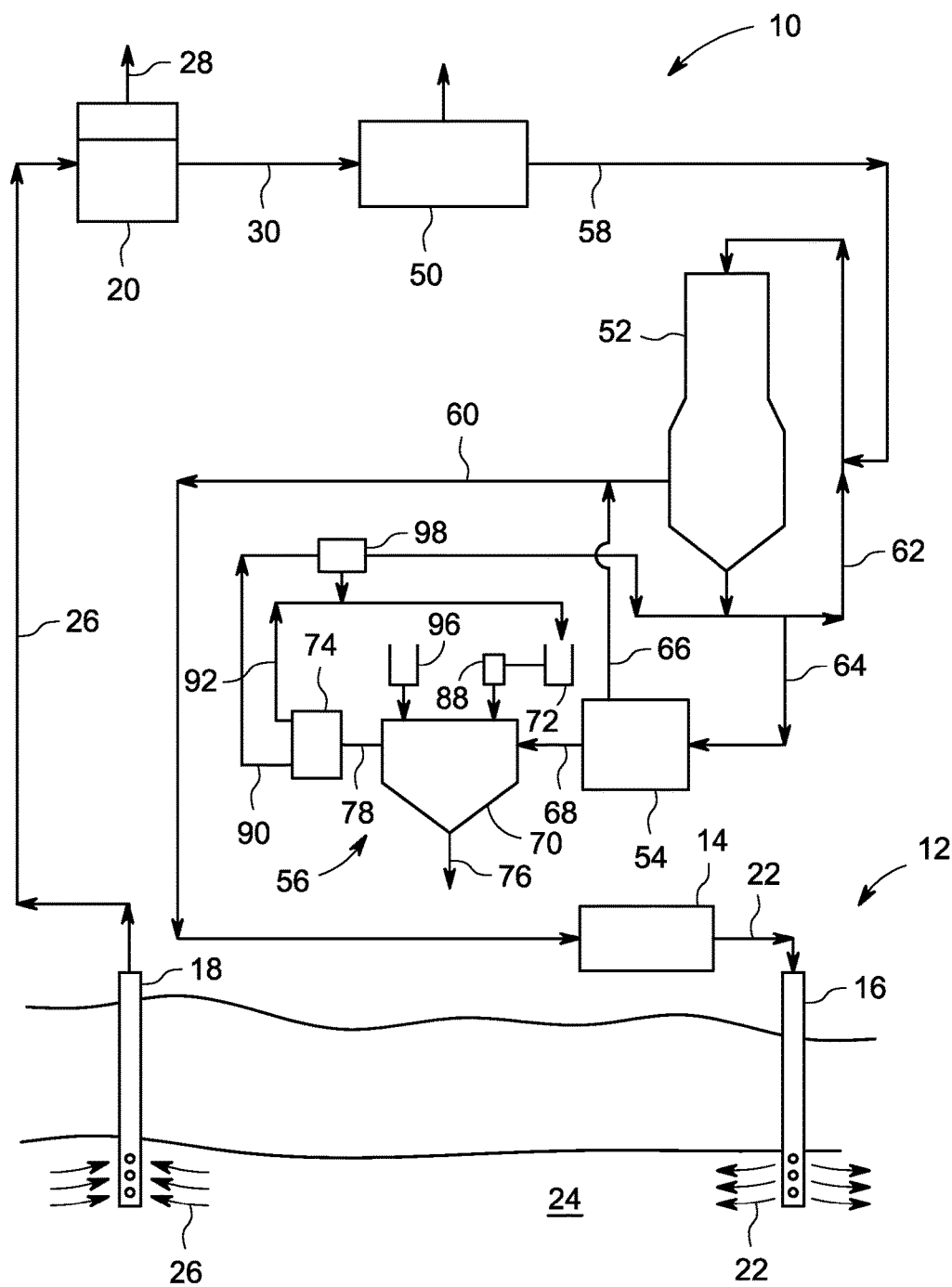

US 10,131,561 B2

TREATMENT OF PRODUCED WATER CONCENTRATE

FIELD

This specification relates to a method and apparatus for treating water, for example produced water.

BACKGROUND

Canadian Patent 2 509 309 by Heins, entitled Water Treatment Method for Heavy Oil Production Using Calcium Sulfate Seed Slurry Evaporation, describes an evaporator based method of treating produced water from heavy oil production. Produced water is first treated in a de-oiling step to reduce oil and grease to about 20 parts per million or less. De-oiled water is introduced into an evaporator to produce a distillate and an evaporator blowdown containing concentrated residual solids. The distillate is used, optionally after further polishing, to create steam in a once-through steam generator or other boiler. The evaporator blowdown may be further treated in a crystallizer.

SUMMARY

The following summary is intended to introduce the reader to the detailed description to follow and not to limit or define the claimed invention.

Blowdown from an evaporator used to treat produced water often contains contaminants, such as silica, that interfere with or prevent discharging the blowdown. A crystallizer may be used to concentrate the blowdown to reduce the volume of blowdown that must be discharged. A crystallizer is ordinarily intended to produce dry, or easily dried, crystals made up of solids precipitated from water fed to the crystallizer. However, when a crystallizer is used to treat produced water, particularly produced water from heavy oil production, the crystallizer may instead produce a blowdown in the form of a slurry. The slurry contains salts, for example silica salts, at concentrations above their ordinary limits of solubility in water and yet the solids are not crystallized and cannot be easily separated from the slurry. Without intending to be limited by theory, the inventors believe that concentrated organic compounds from the produced water remaining in the slurry interfere with crystal growth and precipitation even for salts that are highly saturated or dispersed in the slurry.

In a method and apparatus described in this specification, a solvent and a compound or solution comprising multivalent cations is mixed with a concentrate, for example a concentrate produced by an evaporator or crystallizer. This causes or allows solids in the concentrate to form particles which can be separated from the concentrate. The solvent may be recovered before or after separating the particles.

In a method of treating an aqueous mixture described in this specification, for example produced water from heavy oil extraction, a solvent and a source of ions are added to the mixture. Optionally, water may be first removed from the mixture to produce a concentrate. The mixture may be, for example, brine, blowdown or slurry produced by one or more thermal treatment devices. The mixture may contain one or more salts, for example a silica salt, which may be at a super-saturated concentration or in a dispersion, and one or more organic compounds. The source of ions may be, for example, a salt, oxide or hydroxide in solid form or in solution. Solids, optionally including precipitates of one or more of silica salts and organic compounds, are removed from the mixture. At least some of the solvent may be recovered from the mixture.

An apparatus for treating produced water described in this specification comprises one or more concentrating devices, for example thermal treatment devices, a mixing vessel, a chemical feeding system, and a solid-liquid separation device. A blowdown or recirculation line from the one or more concentrating devices is connected to the mixing vessel. The mixing vessel is also in communication with the chemical feeding system. The solid-liquid separation device is incorporated with or downstream of the mixing vessel. Optionally, the apparatus may further also comprise a solvent recovery unit.

The method and apparatus are useful, for example, in providing an alternative means of treating produced water, or other water containing dissolved salts and organic compounds, particularly water with (a) a total solids concentration of 10 wt % or more having a water soluble organics concentration that is 25% or more of the total solids concentration or (b) water with a water soluble organics concentration of 6 wt % or more. The method and apparatus may be incorporated into a method and apparatus for extracting heavy oil.

BRIEF DESCRIPTION OF THE FIGURE

FIG. 1 is a schematic process flow diagram of a produced water treatment system combined with a heavy oil extraction system.

DETAILED DESCRIPTION

FIG. 1 shows a water treatment system 10 in combination with a heavy oil, for example bitumen, recovery system 12. The heavy oil recovery system 12 has a boiler 14, an injection well 16, a production well 18 and an oil-water separator 20. The boiler 14 may be, for example, a once through steam generator (OTSG) or a packaged boiler. The boiler 14 produces steam 22 which flows to the injection well 16. Injection well 16 carries the steam 22 into a geologic formation 24 containing heavy oil, for example bitumen in the oil sands areas of Alberta, Canada. The steam 22 fluidizes bitumen in the formation 24 and later condenses. An oil and water mixture 26 is produced and withdrawn from the production well 18. The oil and water mixture 26 is sent to the oil-water separator 20. Product oil 28 is removed from the oil-water separator 20 for further refining. Produced water 30, which remains after the product oil 28 is removed from the oil and water mixture 26, flows to the water treatment system 10 for further treatment. The heavy oil recovery system 12 may be, for example, a steam assisted gravity drainage (SAGD) or cyclic steam stimulation (CSS) system.

The water treatment system 10 has a de-oiling unit 50, an evaporator 52, an optional crystallizer 54 and a blowdown treatment system 56. The de-oiling unit 50 receives the produced water 30 and removes additional oil, for example emulsified oil, from the produced water 30 to produce de-oiled water 58. The de-oiling unit 50 may be, for example, a dissolved gas flotation unit, a walnut shell filtration unit, a de-oiling polymer mixing tank, a sorbent unit, a membrane unit or another device. A suitable evaporator 52 and crystallizer 54 are available from GE Ionics, Inc. Optionally, other forms of concentrating devices, such as a membrane filtration unit, membrane distillation unit, electrodialysis unit, ion exchange unit, or supercapicator desalination unit may be used. The water treatment system 10 may also be used to treat other forms of water.

De-oiled water 58 is treated further in the evaporator 52, optionally after intermediate treatment steps. However, a warm lime softener is not necessarily required upstream of the evaporator 52 and is, in an embodiment, avoided. Evaporator 52 may be, for example, a mechanical vapour recompression (MVC or MVR) evaporator. The evaporator 52 may be seeded or unseeded and may use a falling film or other internal arrangement. The evaporator 52 may have associated equipment used, for example, to alter the pH of the de-oiled water or remove gases or alkalinity from the de-oiled water 58. The evaporator 52 removes water vapour from the de-oiled water 58. The removed water vapour, when condensed, forms distillate 60 which is returned to the boiler 14 for re-use in the heavy oil recovery system 12, optionally after further treatment.

The evaporator 52 also has a brine recirculation loop 62. Evaporator blowdown 64 may be withdrawn from the brine recirculation loop 62 or directly from the evaporator 52. The evaporator blowdown 64 has a high concentration of various contaminants that were present in the de-oiled water 58. In particular, the evaporator blowdown 64 has a high concentration of silica. In the absence of preferential precipitation crystals, adjusted pH, high temperature or other conditions maintained in the evaporator 52, the silica in the evaporator blowdown 64 becomes scale forming. The evaporator blowdown 64 is therefore not suitable for discharge in many locations. The evaporator blowdown 64 may have a total solids (TS) concentration of 100,000 ppm or more, total dissolved solids (TDS) of 50,000 ppm or more, water soluble organic solids (WSO) of 20,000 ppm or more, and silica at 10,000 ppm or more. WSO concentration tends to be about twice the total organic compounds (TOC) concentration. The evaporator blowdown 64 is particularly difficult to treat when (a) the total solids concentration is 10 wt % or more and the water soluble organics (WSO) concentration is 25% or more of the total solids concentration or (b) the water soluble organics concentration is 6 wt % or more.

In the water treatment system 10, the evaporator blowdown 64 is treated further in the crystallizer 54. Crystallizer 54 removes additional water vapour from the evaporator blowdown 64 which, when condensed, forms second distillate 66. Second distillate 66 may be returned to the boiler 14 for re-use in the heavy oil recovery system 12, optionally after further treatment.

The crystallizer 54 also produces a crystallizer blowdown 68. Crystallizer blowdown 68 has an even higher concentration of silica and other dissolved solids compared to the evaporator blowdown 64. Under some conditions, the crystallizer 54 produces precipitated solids that are easily dried. However, in other situations, particularly when treating produced water 30 from a steam or water flood assisted oil recovery operation, the crystallizer 54 instead produces a crystallizer blowdown 68 in the form of a slurry having a high solids concentration. Silica and other dissolved solids may be present in the slurry under super-saturated conditions or in a dispersion but do not precipitate and settle from the slurry. For example, the crystallizer blowdown 68 may have a total solids (TS) concentration of 40 wt % or more or 50 wt % or more. The evaporator 52 and crystallizer 54 are types of thermal treatment devices, alternatively called distillation devices. Optionally, alternative thermal treatment devices, in one or more stages, may be used to create slurry similar to the crystallizer blowdown 68.

In the water treatment system 10, the blowdown treatment system 56 treats crystallizer blowdown 68. Optionally, the blowdown treatment system 56 may treat evaporator blowdown 64 directly, and the crystallizer 54 may be omitted. Further optionally, the blowdown treatment system 56 may be located within the brine recirculation loop 62. In that case, the evaporator blowdown 68 may be omitted or the flow rate of evaporator blowdown 68 may be made smaller. Silica removal may be 98% or 99% or more regardless of whether the blowdown treatment system 56 treats crystallizer blowdown 68 or evaporator blowdown 64 directly. However, TS and WSO removal rates increases, and solvent quantity relative to volume of de-oiled water 58 decreases, as the TS of the blowdown or brine being treated increases.

Any of the blowdowns 64, 68 or brine 62 may have a water soluble organics (WSO) concentration of 3 wt % or more or a total organic carbon (TOC) concentration of 2 wt % or 2.2 wt % or more. Under these conditions, silica and other salts will not spontaneously precipitate even if they are super-saturated.

In the example of FIG. 1, the crystallizer blowdown 68 is sent to the blowdown treatment system 56. The blowdown treatment system 56 shown comprises a reaction vessel 70, a solvent dosing system 72, an ion dosing system 98 and a solvent recovery system 74. Ions, in an embodiment multivalent metal cations, are added from the ion dosing system 98 to the crystallizer blowdown 68. Solvent is also added from the solvent dosing system 72 to the crystallizer blowdown 68. Optionally, the chemical dosing system 72 may comprise a combined ion and solvent feeding devices. All three of the reactants are mixed together in the reaction vessel 70. The reaction vessel 70 may be, for example, one or more mixing tanks or vessels, or one or more conduits with in-line mixing. The source of ions may be, for example a salt, oxide, hydroxide, polymer or a solution thereof. In some cases, the ions may be present in the form of a compound that does not necessarily dissolve or ionize in the crystallizer blowdown 68. The source of ions might not be required, although it may still be beneficial, when treating some concentrates of the de-oiled produced water 58. However, the additional ions are likely to at least materially improve the process when treating water with (a) a total solids concentration of 10 wt % or more wherein the water soluble organics (WSO) concentration is 20% or more of the total solids concentration or (b) a WSO concentration of 6 wt % or more. At least one of these conditions is likely to be exceeded when treating crystallizer blowdown 68.

Precipitated solids 76 form, settle and are removed from the reaction vessel 70, which acts in this case as an integrated solid-liquid separation unit. Alternatively, the precipitated solids 76 may be removed by a separate solid-liquid separation unit such as a centrifuge, filter, filter press, hydrocyclone or clarifier. In a further alternative, solvent may be recovered from the crystallizer blowdown 68 before or after the precipitated solids 76 are removed. However, solids are, in an embodiment, separated before recovering the solvent since this may increase the amount of organic compounds removed with the precipitated solids 76.

The mass of solvent added may be equal to or greater than the mass of mixture being treated (i.e. concentrate, blowdown 64, 68 or brine 62 etc.) by mass. Optionally, the solvent may be added to the mixture being treated in a ratio by mass of between 3:1 and 15:1 or between 6:1 and 15:1 solvent to mixture. The salt may be added in a molar ratio of divalent ions or equivalent (for example Ca++ ions or equivalent) to silica of between 0.25:1 to 4:1 or between 0.5:1 and 2:1, for example in a range of about 1:1 to 1.2:1. Calcium, for example, may be added in solution or as a solid compound such as a salt, oxide, hydroxide or polymer. Suitable calcium compounds include CaCl2, Ca(NO3)2, CaO, Ca(OH)2.

The solvent is, in an embodiment, capable of dissolving one or more water soluble organic compounds present in the mixture being treated. The organic compounds typically comprise a wide range of long chain hydrocarbons or oily substances that are difficult to fully analyze. However, it may be sufficient for the solvent to dissolve one or more of the organic compounds that make up a significant portion of the total organic compounds. The solvent should also be capable of forming a solution or other mixture with water under some conditions, but capable of being recovered from water under other conditions or under the influence of a treatment. The conditions may vary, for example, by temperature, pressure or pH. The treatment may be, for example, decantation, filtration, distillation, membrane distillation or steam stripping. One particularly useful solvent is diisopropylamine (DIPA).

The remaining blowdown-solvent mixture 78 is sent to the solvent recovery system 74. The solvent recovery system 74 shown is a liquid-liquid separation (decantation) tank having a lower outlet connected to a waste brine stream 90 and an upper outlet connected to a recovered solvent stream 92. Blowdown-solvent mixture 78 enters the solvent recovery system 74 and is heated to a temperature at which the solvent separates from water. In the case of DIPA, this temperature is about 70 or 74 degrees C. or more. Liquid recovered solvent 92 is pumped from the upper outlet. Waste brine 90 is pumped from the lower outlet. The pumps (not shown) are controlled using inputs from a level sensor to maintain a solvent-water interface between the lower outlet and the upper outlet. Decantation cannot be used to separate all solvents, but is in an embodiment preferred when possible because it is more energy efficient than, for example, distillation. However, distillation or other forms of solvent recovery system may be in an embodiment preferred for other solvents.

The solvent recovery system 74 separates the blowdown-solvent mixture 78 into recovered solvent 92 and waste brine 90. Recovered solvent 92 may contain some water, for example up to 10 wt % water. When using DIPA, for example, some water is present in recovered solvent 92 collected by decantation. The amount of water in the recovered DIPA varies with the operating temperature of the solvent recovery system. DIPA separated by decantation at about 74 degree C. typically has 6 to 7 wt % water. The presence of some water in the recovered solvent 92 increases the volume of solvent added to the reaction vessel 70 per unit of mixture treated but does not prevent the removal of precipitated solids 76. When using DIPA, the waste brine 90 may have 6,000 ppm to 10,000 ppm DIPA. The waste brine 90 is, in an embodiment, treated to remove this solvent whether the treated waste brine 90 will be discharged or returned to the evaporator 52. In the example of FIG. 1, solvent in the waste brine 90 is removed in a stripper 98, for example a steam stripper or hot air stripper. The treated waste brine 90 is returned to the evaporator 52 or thermal crystallizer 54. The recovered solvent is returned to the solvent dosing system 72.

The crystallizer blowdown 68 may be hotter than the temperature required or desired in the reaction vessel. DIPA, for example, will not mix with water above about 70 degrees C. and tends to mix more readily at lower temperatures, even as low as −5 to 5 degrees C. However, cooling requires energy and it is preferable in an embodiment, assuming adequate solids removal, to operate the reaction vessel at between about 10 degrees C. and 50 degrees C. The crystallizer blowdown 68 is viscous and sticky and difficult to cool using ordinary equipment such as a heat exchanger. Instead, the solvent is cooled in heat exchanger 88 to a temperature low enough to maintain a desired temperature in the reaction vessel 70 despite the heat released from the crystallizer blowdown 68, the released heat due to mixing the solvent and the crystallizer blowdown 68 and the released heat due to salt crystalliztion. Optionally, heat captured in the heat exchanger 88 may be used to heat the blowdown-solvent mixture 78 in or on its way to the solvent recovery system 74.

The precipitated solids 76 include organic compounds and may include some of the solvent. The precipitated solids 76 may be treated to remove the solvent or organic compounds, or both, if required to meet discharge or disposal requirements relating to the precipitated solids. For example, the precipitated solids 76 may be dried, heated, vacuumed, embodied in cement, or washed with water or another solvent.

The waste brine 90 may be discharged or recycled to the water treatment system 10, for example by being sent back to the evaporator 52 or crystallizer 54. Since organic compounds may interfere with the operation of the water treatment system 10 and residual amounts of organic compounds may exist in the waste brine 90, the waste brine 90 is, in an embodiment, treated before it is recycled to the water treatment system 10. For example, chemicals may be added to the waste brine 82 to oxidize the organic compounds. Alternatively, or additionally, the organic compounds may be digested biologically or filtered out. In a further alternative, the organic compounds may be recovered for their value as industrial chemicals.

All of the treated waste brine 90 may be returned to the water treatment system 10. However, some or all of the waste brine 90 are, in an embodiment, removed from the water treatment system 10, optionally after treating the waste brine 90 if required to meet any standards required for discharge or disposal. In this way, the waste brine 82 provides a further bleed of water soluble organic compounds from the water treatment system 10 to inhibit the accumulation of any particular organic compounds or highly soluble salts that are not effectively removed with the precipitated solids 76 or by any other process in the water treatment system 10.

Optionally, the evaporator 52 or the crystallizer 54 (or other concentrating devices) may be operated such that the water (i.e. brine, concentrate or blowdown) flowing to the blowdown treatment system 56 has one or more of a) a TS concentration of between about 12 and 66 wt % or more; b) a TDS concentration of between about 7 and 44 wt % or more; c) a TOC concentration of between about 2.2 and 8.8 wt % or more; d) a WSO concentration between about 3 and 22 wt % or more; e) a silica concentration between about 1.5 to 6.0 wt %; (f) pH of 9 or more, 11 or more or 13 or more; and, (g) a WSO concentration that is 20% or more, 25% or more, or 30% or more of the TS concentration.

The ions added to the blowdown treatment system 56 in an embodiment comprise the Ca++ ion. Without intending to be limited by theory, it is believed that the Ca++ complexes with water soluble organics to form precipitates so the water soluble organics can be removed from the evaporator blowdown 64 or the crystallizer blowdown 68. Water is extracted into the solvent phase, which makes the precipitates of water soluble organics and CaSiO3 easily settled and de-watered from a solvent-water mixture, particularly a DIPA-water mixture. Alternatively, other multivalent cations, such as Mg++, Al+++, Fe+++, in solution or compounds such as their solid salt, oxide, hydroxide or polymer forms, may be used.

A process carried out in the water treatment system comprises a step of mixing a solvent and a source of ions with a water to be treated such as a brine, blowdown or concentrate. The mixture, or the brine, blowdown or concentrate, is treated in a solid liquid separation step to remove solids. Optionally, a liquid-liquid separation step may be added to recover at least some of the solvent.

Example

Produced water from a SAGD operation in the oil sands region of Alberta, Canada, was de-oiled and treated in an evaporator. Blowdown from the evaporator was collected. The blowdown had contaminant concentrations and characteristics as follows: total organic carbon (TOC)—22,000 ppm; pH at 20 degrees C. of 13.7; total dissolved solids (TS)—132,000 ppm; TDS—84,000 ppm; silica—14,700 ppm; water soluble organics (WSO)—48,000 ppm; sodium—36,300 ppm; calcium—170 ppm; p-Alkalinity (as CaCO3)—34,400 ppm; t-Alkalinity (as CaCO3)—49,300 ppm; and, sulfur—4,800 ppm. TS was measured by drying a sample at 105 degrees C. and dividing the mass of the dried sample by its original mass. TDS was measured by drying a sample at 550 degrees C. and dividing the mass of the dried sample by its original mass. WSO is calculated as the difference between TS and TDS.

Four samples were prepared with the evaporator blowdown. Sample A contained 54 g of isopropylamine (IPA), 9 g of evaporator blowdown, and no additional salt. Sample B contained 54 g of IPA, 9 g of evaporator blowdown, and 1 g CaCl2 40% solution. Sample C contained 54 g of DIPA, 9 g of evaporator blowdown, and no additional salt. Sample D contained 54 g of DIPA, 9 g of evaporator blowdown and 1 g of CaCl2 40% solution. The solvent and blowdown for each sample were poured into a jar and shaken to mix the sample components. Calcium chloride solution was then added for Samples B and D. After a short waiting period at 25 degrees C., the contents of each sample jar was filtered under vacuum through a 5 micron pore size filter. 0.40 g of solids were collected on the filter paper from sample A. 0.48 g of solids were collected on the filter paper from sample B. 0.03 g of solids were collected on the filter paper from sample C. 2.18 g of solids were collected on the filter paper from sample D. The liquid passing through the filter paper from each sample was collected in a vessel and then heated. The liquid from samples A and B did not separate into solvent and water phases. The DIPA separated from the water at about 70 degrees C. in the vessel for samples C and D. The separated water from sample D was clearer than the water separated from sample C. TS reductions were: Sample A—16%; sample B—19.2%; sample C—1.2%; sample D—87.2%.

The separated water for Sample D also had a silica reduction of 99.5%; sodium reduction of 80.2%; sulfur reduction of 75.4%; and, WSO reduction of 48.7%. The precipitate from Sample D was noticeably black in colour, believed to be caused by removal of organic compounds.

In another trial, magnesium ions were used, rather than calcium ions, with DIPA. Solids were successfully precipitated, although they were more sticky and more difficult to de-water than when calcium ions were used.

Further tests with DIPA but without added salts did not produce significant amounts of precipitates at solvent/feed mass ratios from 6:1 to 15:1 at ambient (10 to 25 degrees C.) temperatures.

In another test, a crystallizer blowdown having a TS concentration of 66 wt % and a WSO concentration of 22 wt % was treated with DIPA at a solvent to feed (blowdown) mass ratio of 6:1 and Ca++ ions at a molar ratio to silica of 1:1. An easily dewatered solid precipitate was produced that, based on visual observation, appeared to contain at least most of the solids in the original blowdown.

Further tests were conducted with the evaporator blowdown described above at its original concentration (Sample E), concentrated to 2 times (Sample F), and concentrated to about 4 times (Sample G) its original concentrations. DIPA was used at a solvent to feed mass ratio of 6:1. Ca++ ions were added at a molar ratio to silica of 1:1. Mixed samples were maintained at 10 degrees C. for 15 minutes before being separated by being filtered under vacuum through a 5 micron pore size filter. The solvent was separated from the water by heating to a temperature of about 70 degrees C. TS reductions were about 83% for Sample E; 85% for Sample F; and, 88% for Sample G. Due to the increased TS concentrations in the feed blowdown between Samples E to G, TS concentration in the treated water rose between Samples E to G, but was still less than 6 wt % for Sample G. WSO for the blowdown in Sample G was 24 wt % before treatment and about 9 wt % after treatment, or about a 60% reduction in WSO.

Further tests using oil sands SAGD produced water blowdowns involved an evaporator blowdown (Sample H) having about 13 wt % TS and about 5 wt % WSO; another evaporator blowdown (Sample I) having about 25 wt % TS and about 10 wt % WSO; and, a concentrate of the first evaporator blowdown (Sample J) having about 54 wt % TS and about 22 wt % WSO. The samples were treated with DIPA at a solvent to feed (blowdown) mass ratio of 6:1 and Ca++ ions at a molar ratio to silica of 1:1 generally as described above. TS removals were 62% for Sample H; 79% for Sample I; and, 95% for Sample J. WSO removal was 67% for Sample H; 88% for Sample I and 97% for Sample J. Silica removals were 99.6% for Sample H, 99.7% for Sample I and 99.9% for Sample J.

This written description uses examples to disclose the invention and also to enable any person skilled in the art to practice the invention. The patentable scope of the invention is defined by the claims, and may include other examples that occur to those skilled in the art.

The invention claimed is:

1. A proccess for extracting oil, the process comprising the steps of:
   a) producing steam;
   b) injecting the steam into a formation comprising oil;
   c) withdrawing a mixture of water and oil from the formation;
   d) separating produced water from the mixture of water and oil;
   e) treating the produced water to produce a distillate and a concentrate;
   f) using the distillate to produce additional steam for injection into the formation;
   g) mixing a solvent and a compound or solution containing multi-valent cations with the concentrate;
   h) after step g, separating precipitated solids comprising one or more salts from the concentrate; and i) recovering the solvent from the mixture with the concentrate and mixing the recovered solvent with additional concentrate from step e).

2. The process of claim 1, wherein the oil is heavy oil or bitumen.

3. The process of claim 1, wherein steps a), b), and c) are part of a steam assisted gravity drainage (SAGD) or cyclic steam stimulation (CSS) operation.

4. The process of claim 1, wherein step e) comprises treating the produced water with an evaporator to produce a brine or evaporator blowdown, wherein the concentrate comprises the brine, the evaporator blowdown, or a further concentration of the evaporator blow down.

5. The process of claim 1, wherein the solvent comprises diisopropylamine.

6. The process of claim 1, wherein the multi-valent cations comprise calcium.

7. The process of claim 1, further comprising a step of removing the concentrate from the process after the steps of recovering solvent and separating precipitated solids.

8. The process of claim 1, further comprising a step of treating organic compounds in the concentrate and returning treated concentrate to the process at or upstream of step e).

9. A method for treating a mixture of water, one or more salts in solution, and one or more organic compounds, the method comprising the steps of:
　a) adding a solvent and a source of ions to the mixture;
　b) removing precipitates of one or more salts comprising at least some of the ions from the mixture; and
　c) recovering at least some of the solvent from the mixture.

10. The method of claim 9, further comprising a step of adding the recovered solvent to an additional amount of the mixture.

11. The method of claim 9, wherein the water comprises produced water.

12. The method of claim 11, wherein the produced water is extracted from a heavy oil containing formation after injecting steam into the formation.

13. The method of claim 9, wherein the mixture comprises a brine, blowdown, or slurry produced by one or more thermal treatment devices.

14. The method of claim 13, wherein the thermal treatment devices comprise an evaporator and a crystallizer.

15. The method of claim 9, further comprising a step of concentrating the mixture.

16. The method of claim 9, wherein the mixture has (i) a water soluble organics concentration of at least 6 wt % or (ii) a total solids concentration of at least 10 wt % and a water soluble organics concentration that is 20% or more of the total solids concentration.

17. The method of claim 9, wherein the solvent comprises diisopropylamine.

18. The method of claim 9, wherein the ions comprise calcium.

19. An apparatus for treating produced water, the apparatus comprising:
　a) one or more thermal treatment devices configured to treat the produced water and produce a brine, blowdown, or slurry in a recirculation or blowdown line;
　b) a mixing vessels, the mixing vessel in communication with the recirculation or blowdown line;
　c) a solvent feeding system in communication with the mixing vessel;
　d) a multi-valent cation feeding system in communication with the mixing vessel;
　e) a solid-liquid separation device; and
　f) a solvent recovery system downstream of the mixing vessel.

20. The apparatus of claim 19, wherein the solid-liquid separation device is incorporated with, or downstream of, the mixing vessel.

21. The apparatus of claim 20, wherein the one or more thermal treatment devices comprise an evaporator and a crystallizer.

22. The apparatus of claim 19, wherein the one or more thermal treatment devices comprise two or more thermal treatment devices in series.

23. The apparatus of claim 19, further comprising a treatment system adapted to oxidize or remove organic compounds downstream of the solvent recovery system.

24. A process for treating produced water from heavy oil extraction, the process comprising the steps of:
　a) de-oiling the produced water;
　b) treating the de-oiled produced water in an evaporator to produce a concentrate;
　c) adding diisopropylamine to the concentrate;
　d) adding a compound or solution containing calcium to the concentrate;
　e) separating solids from the concentrate; and
　f) after step d), recovering diisopropylamine from the concentrate.

25. The process of claim 24, further comprising a step of treating the concentrate to remove or oxidize one or more organic compounds in the slurry and returning treated concentrate to, or upstream of, step b).

26. The process claim 24, wherein the concentrate comprises water and has (i) a total solids concentration of 10 wt % or more and a water soluble organics concentration that is 25% or more of the total solids concentration or (ii) a water soluble organics concentration of 6 wt % or more.

* * * * *